May 23, 1961     A. W. SHAW     2,984,931
FISHING IMPLEMENT
Filed Dec. 18, 1958
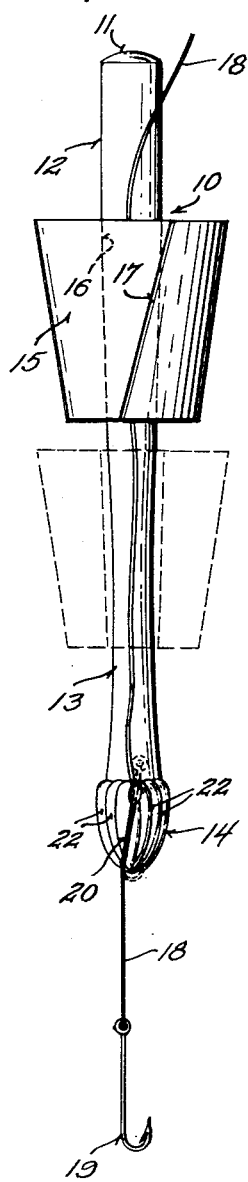
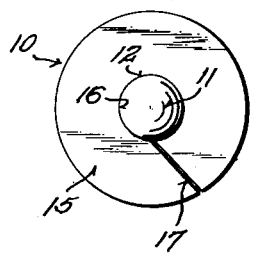
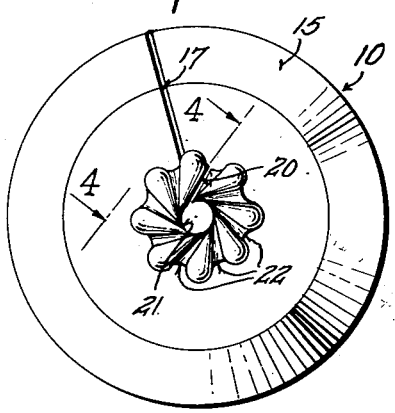
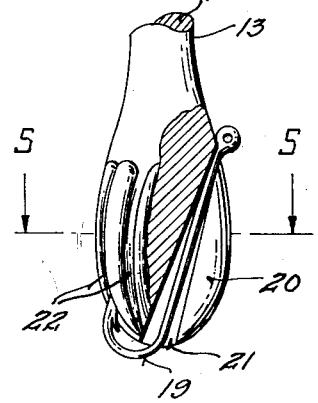
INVENTOR.
ARTHUR W. SHAW
BY
Attorney United States Patent Office 2,984,931
Patented May 23, 1961

2,984,931
FISHING IMPLEMENT
Arthur W. Shaw, 321 N. 29th St., Milwaukee, Wis.
Filed Dec. 18, 1958, Ser. No. 781,337
7 Claims. (Cl. 43—44.91)

This invention relates to a fishing implement.

The tackle box of the average fisherman frequently contains numerous forms of lures, hooks, bobbers, disgorgers and various other accouterments. Not infrequently upon landing a fish, it is discovered that the barbed hook is imbedded so firmly within the fish as to preclude its ready removal therefrom. When this condition is encountered the fisherman is required to open his tackle box and search through the various implements to find a disgorging tool to effect the removal of the hook from the fish. On many occasions the tackle box is not conveniently located and the fisherman frequently encounters difficulties, such as barbed hooks, in an attempt to hurriedly locate and remove the disgorging tool from the tackle box.

The primary object of the present invention is to provide a new and improved fishing implement which overcomes the need of an auxiliary implement for effecting the disgorging of a hook from the fish.

Another object of the present invention resides in the provision of a new and improved fishing implement which is a multi purpose device adapted for cooperative use as a bobber, disgorger and a protector to insure against entanglement of the hook, when not in use, with the fisherman's clothing or other equipment.

Another object resides in the provision of a new and improved bobber which includes a disgorging tool that serves the dual purpose of facilitating the disgorging operation and also provides a means by which the barbed portion of the hook is protected when not in use, to insure against its accidental entanglement with the clothing or other equipment of the fisherman.

Another object resides in the formation of the fishing implement in a manner that permits the ready application of the fishing line and its associated hook to the device or its removal therefrom.

Another object resides in the provision on the stem of the bobber of a shank portion having a reduced diameter to facilitate the ready and easy application to or removal from the implement of the fishing line and associated hook.

Another object resides in the formation of the disgorger portion of the implement to afford protection for the barbed portion of the hook when the same is not in use.

Other objects and advantages will become apparent from the following description of an illustrative embodiment of the present invention.

In the drawing:

Figure 1 is a side elevational view of a fishing implement constructed in accordance with the teachings of the present invention;

Fig. 2 is a top plan view of the device shown in Fig. 1;

Fig. 3 is an enlarged bottom plan view of the device;

Fig. 4 is an enlarged fragmentary elevational view, taken substantially on the line 4—4 of Fig. 3 showing in detail the construction of the disgorger end of the implement; and Fig. 5 is a horizontal sectional view, taken on the line 5—5 of Fig. 4, showing the fluted contour of the disgorger end of the implement.

To the best of my knowledge, no simple and effective fishing implement has been devised which will serve effectively as a multiple purpose device for selective cooperative use as a bobber, disgorger and hook protector.

The embodiment of the present invention chosen for illustrative purposes in the accompanying drawing discloses a fishing implement 10 comprising a stem 11 formed of any suitable material and provided with a cylindrical upper end portion 12, a shank portion 13 having a lesser diameter than the cylindrical upper portion and a lower end portion 14. The lower end portion 14 is preferably bulbular in form to facilitate its ready insertion into and removal from the mouth of the fish to facilitate the use of the device for its disgorging purpose.

A buoyant member 15 formed of suitable material such as cork or a hollow plastic, of any desired shape, includes a central axial bore 16 having a diameter which is slightly less than the cylindrical portion 12 of the stem 11 on which it is slidably receivable. The buoyant member 15 is provided with a slot 17 extending substantially radially between the central axial bore 16 and the peripheral surface of the buoyant member to afford the desired yieldable characteristic for insuring a gripping contact between the buoyant member 15 and the stem 11. The slot 17 which extends from top and bottom of the buoyant member 15 also affords a passage through which a fish line 18 may be inserted when the buoyant member 15 is lowered to a position in which it encompasses the shank portion 13 of the stem 11 which is of smaller diameter than the cylindrical upper end portion 12 of the stem. After the line 18 has been inserted to a position within the central axial bore 16 of the buoyant member 15, the member 15 may be moved upwardly to releasably retain the line 18 in frictional clamping engagement between the outer surface of the cylindrical portion 12 of the stem 11 and the surface of the central axial bore 16 of the buoyant member 15. Before effecting the releasable retention of the line 18 on the stem 11, the desired length of line is permitted to extend below the buoyant member 15 to adjust the desired fishing depth for a barbed hook 19 secured to the lower end of the line 18. After the line 18 has been adjusted to desired length, its intermediate portion is passed through an axially extending radially disposed slot 20 formed in the lower end portion 14 of the stem 11. The slot 20 interrupts the outer surface of the lower end portion 14 of the stem 11 and is preferably disposed at a slight angle with respect to the axis of the stem 11. The inner end of the slot 20 intersects the peripheral surface of an angularly disposed bore 21, which is preferably conical in form having its base at the lowermost end of the stem 11 and with its apex adjacent the surface of the stem and the upper end of the slot 20. The width of the slot 20 is such that it will permit the ready admission of the fishing line 18 without being large enough to permit the shank of the hook 19 to pass through the slot 20. The surface of the lower end portion 14 of the stem 11 is provided with a plurality of circumferentially spaced substantially axially disposed flutes 22 which serve to selectively receive the barbed portion of the hook is disposed within one of the flutes 22. In order to retain the hook 19 in a position where a flute 22 serves to protect the point of the barb of the hook, the buoyant member 15 is moved downwardly to a position surrounding the shank portion 13 of the stem 11 and the line is drawn tautly and the buoyant member raised to a position on the cylindrical portion 12 of the stem 11 to releasably retain the barbed hook 19 in protected position on the lower end portion 14 of the stem 11. The protected position of the hook 19 is shown in Fig. 4 of the accompanying drawing.

From the foregoing description of the fishing implement, it will be noted that the device is adapted for use as a bobber and the length of the line 18 may easily be adjusted to afford the proper fishing depth by moving the buoyant member 15 downwardly to a position wherein it encompasses the shank portion 13 of the stem to permit the desired lengthening or shortening of the amount of line disposed below the buoyant member 15. When the proper length of line has been selected, the buoyant member is moved to a position wherein it encompasses the cylindrical portion 12 of the stem 11 to effect the resilient, yieldable clamping action between the stem 11 and the surface of the central axial bore 16 of the buoyant member 15 to retain the line in properly adjusted position.

If the barbed hook 19 becomes embedded in the fish so that it is not readily removable therefrom, the bobber serves as a disgorging tool. The fisherman may grasp either the buoyant member 15 or the stem 11 in one hand and grasp that portion of the line 18 disposed between the slot 17 in the buoyant member 15 and the slot 20 in the lower end portion 14 of the stem in the other hand and draw upwardly on the line to retract the hook 19 through the bore 21 with the result that the lower extremity of the stem 11 enters the mouth of the fish to provide a solid portion against which the barbed portion of the hook may be drawn to effect a cutting action on the flesh of the fish to thereby disgorge the hook from its embedded position within the fish.

The fishing implement, in addition to serving jointly as a bobber and disgorging tool, is provided with means that functions to afford safe storage positioning of the barbed hook when it is not in use.

The foregoing description of the present invention covers both its structure and use. From this description, it will readily be understood that a simple, inexpensive and effective fishing implement has been provided which will permit its cooperative selective use, as the occasion may require, as a bobber, a disgorging tool and a means of affording a safe storage positioning of a barbed hook when the same is not in use.

While the device has been described in considerable detail in the foregoing specification, it is to be understood that various changes may be made in its embodiment without departing from or sacrificing any of the advantages thereinafter claimed.

I claim:

1. The combination with a fish line having a hook thereon of a fishing implement adapted for releasable application to the line at any desired distance from the hook, said implement comprising a stem and a buoyant body slidably positionable thereon, said stem having an overall length greater than twice that of said body and including a cylindrical upper portion of greater length than said body, an intermediate shank portion of greater length than said body and having a smaller diameter than said cylindrical portion, and a lower end portion having a diameter greater than said intermediate portion, said buoyant body serving as a float to normally maintain said implement on the surface of the water, said body being provided with an axial stem receiving bore and a radial line receiving slot extending the full length of said body from the axial bore through the outer surface of said body to render the same yieldable, the fishing line being adjustably applied to said implement by its introduction through the radial slot in said body to a position adjacent said intermediate shank portion of said stem when said body surrounds the same, the fishing line being releasably retained in selected position on said stem by the gripping action of said yieldable body when the same is raised to a position surrounding said cylindrical portion of said stem.

2. A fishing implement, as set forth in claim 1, in which said lower end portion of said stem serves when introduced in the mouth of a fish as a disgorging tool to facilitate the removal of the impalled hook.

3. A fishing implement, as set forth in claim 1, in which said lower end portion of said stem is provided with a radially disposed longitudinally extending line receiving slot to provide additional positioning means for the fishing line on said stem.

4. A fishing implement, as set forth in claim 1, in which the lower end portion of said stem is provided with a radially disposed longitudinally extending line receiving slot having an enlarged portion adapted to receive the shank of the hook when the line disposed between said lower end portion of said stem and said body portion is retracted.

5. A fishing implement, as set forth in claim 1, in which said enlarged lower end of said stem is provided with a radially disposed longitudinally extending line receiving slot having an enlarged portion adapted to receive the shank of the hook, and provided with a plurality of longitudinally extending circumferentially spaced flutes on its outer surface of said stem against which the barbed portion of the hook engages when the same is in a retracted position to provide a disgorging tool to facilitate the removal of an impaled hook from the mouth of a fish.

6. A fishing implement, as set forth in claim 1, in which the lower end portion of said stem is provided with a plurality of longitudinally extending flutes circumferentially spaced about its surface and between which the barbed portion of the hook is disposed when the same is releasably retained in retracted position by said body portion to provide protection for the barbed portion of the hook.

7. A fishing implement, as set forth in claim 1, in which said implement may be selectively applied to the fishing line in a position whereby the barbed portion of the hook is releasably retained in contact with said enlarged lower end portion of said stem to provide protection for the barbed portion of the hook when the device is not in use.

References Cited in the file of this patent

UNITED STATES PATENTS

| | | |
|---|---|---|
| 1,629,583 | Nelson | May 24, 1927 |
| 2,504,241 | Wulff | Apr. 18, 1950 |
| 2,519,098 | Aye | Aug. 15, 1950 |
| 2,570,293 | Vadnais | Oct. 9, 1951 |